Dec. 18, 1962    M. H. PANNING ETAL    3,068,891
FLOW REGULATOR FOR AIR CONTROL
Filed July 27, 1959

INVENTORS
MARTIN H. PANNING
BRUCE R. CURRY
BY
ATTORNEYS

United States Patent Office 3,068,891
Patented Dec. 18, 1962

3,068,891
FLOW REGULATOR FOR AIR CONTROL
Martin H. Panning and Bruce R. Curry, Thiensville, Wis., assignors to Blower Application Company, Milwaukee, Wis., a corporation of Wisconsin
Filed July 27, 1959, Ser. No. 829,682
3 Claims. (Cl. 137—499)

Our invention relates to an air or fluid control and more particularly to a means of controlling the velocity of the flow passing through a tubular duct.

It is manifest to anyone familiar with air ducts, that it is often desirable and sometimes imperative to control the flow of air and maintain it at a predetermined velocity within a duct. This is especially true when a plurality of branch ducts extend from a main duct, and where the flow of air in the various individual ducts is to be individually varied for a specific purpose and where it is desirable that a variance in the set velocity of one duct does not disturb the set velocity in the other ducts. The device described, illustrated and claimed herein is a self-contained and self-regulating unit readily adaptable to be installed into a conventional duct and easily adjustable within limits to any selected velocity.

The object of our invention is to provide a simple mechanism for controlling the flow of air by means of a damper, which is actuated by the velocity of air passing through the duct.

Another object of our invention is to provide a device of the character described that is readily adjustable or set to any desired velocity.

A still further object of our invention is to provide a mechanism in which a regulating damper is operated by a fan mounted within a duct and in which the fan is actuated by a preselected flow velocity in the duct.

The device is applicable to auxiliary ducts, branching outward from a main duct, making it possible to maintain the air flow in each individual duct at a predetermined velocity.

Other and further objects of our invention will become more apparent as the description proceeds when taken in conjunction with the drawings, in which.

Figures 1, 2, 3:
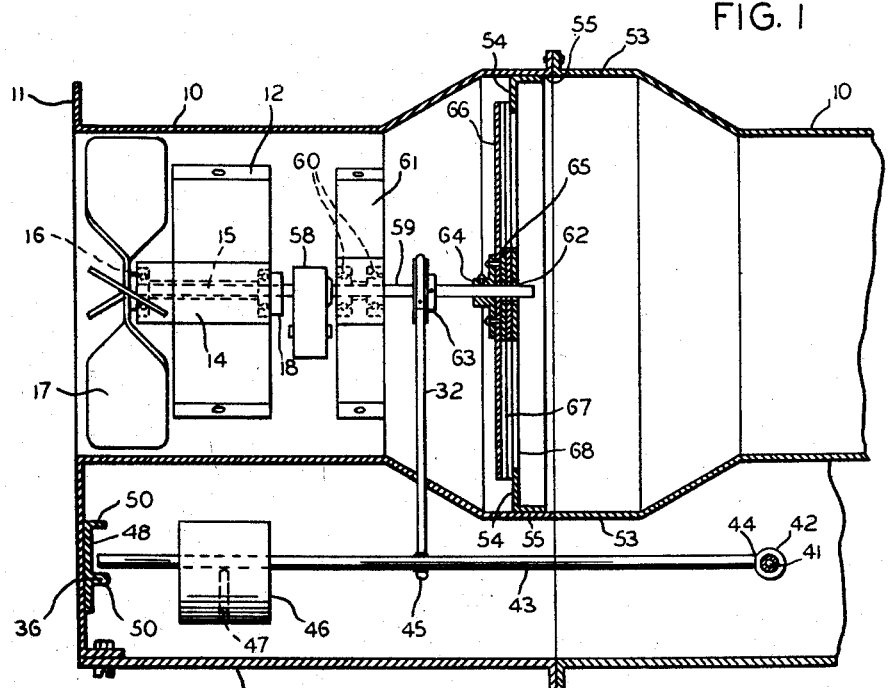
FIGURE 1 is a cross-sectional view of one embodiment in which the damper arrangement consists of a plate equipped with tapered openings of triangular contour, and a plurality of shutters, actuated angularly by means of a fan actuated shaft.
FIGURE 2 is a plan view of the plate and shutter arrangement constituting the damper of FIGURE 1.
FIGURE 3 is a plurality of fanciful cross-sectional views of the damper plate section and shutter segments, showing their relation to one another, and their method of slidably opening and closing the tapered openings in the damper plate.

Similar characters of reference indicate corresponding parts throughout the several views, and referring specifically now to the same, the character 10 designates a tubular casing or body open at both ends and provided with outwardly projecting flanges shown as 11 at the outlet (not shown) and inlet ends of the body 10.

A fan propeller support 12 is shown attached to the body 10 by means of screws 13 extending through the walls of the body 10 to the plates of the support 12. This propeller support 12 is provided with a bearing in the central portion 14, the bearing supporting a revolving fan or propeller shaft 15. The bearing may include a front bearing, shown as 16, and a rear bearing, shown as 18.

A flow responsive vane in the form of a propeller fan is shown at 17 attached to the shaft 15 at the inlet end of the body 10.

An open bottomed longitudinal enclosure 35 forms an integral part of the body 10 and is defined by a front plate 36, a rear plate 37, and two side plates 38 and 38'. A removable cover 39 is attached by means of screws 40 to the enclosure plates. A laterally disposed shaft 41 extending through the walls 38 and 38' provides a bearing for the hollow portion of a sleeve 42 to thereby pivotally mount a balance arm 43 which is attached at 44 to the sleeve 42. The balance arm 43 is provided with an aperture 45 to accommodate a cord 32 which is interconnected with the fan shaft. A sliding weight 46 is shown mounted on the balance arm 43 and is equipped with a set screw 47 for retaining it in a fixed position while allowing the user to longitudinally adjust the weight 46 on the balance arm 43. The rear front wall plate 36 is shown equipped with a limit guide 48. Guide 48 has two inwardly extending projecting members 50 and 50' to limit the movement of the free end of the balance arm 43. The spacing of the member 50 and 50' determines the extent of opening and closing movement of the arm 43.

Removing the plate 39 enables the operator to set the weight 46 to any predetermined longitudinal position on the balance arm 43, and by replacing the plate 39 the entire unit is closed, thereby prohibiting any tampering with the adjustment. The longitudinal position of weight 46 on arm 43 determines the force opposing rotation of shaft 59 and hence the regulation of the air flow as will be described more fully hereinafter.

The tubular casing 10 has an enlarged portion 53 of circular contour, and a fixed damper plate 54 is laterally inserted therein and attached at 55 as shown. The plate 54 is equipped with solid sections 56, tapered from a narrow point near its center to a wide portion near its outer periphery. This construction provides tapered openings 57 between the solid plate sections 56 for the air to pass through, and the purpose of the enlarged central portion 53 is to accommodate a plate 54 of sufficient area for strength, while permitting openings 57 to be of an area large enough to permit a minimum resistance for the flow of air.

The inner end of the shaft 15 terminates in a conventional speed reducer unit shown as 58, which is equipped with a train of gears of varied diameters, engaging one another in a conventional manner. The other end of the speed reducer unit 58 is provided with a shaft 59 journalled in bearings 60 and 60' in an auxiliary support 61 attached to the inner surface of the tubular casing 10.

The shaft 57 extends through the damper plate 54 and 62, and is equipped with a groove sheave 63, around which the cord 32 of the balance bar assembly is placed. The cord 32 attached to the pivoted rod 43 at 45, permits a function similar to the operation outlined above, in its relation to the propeller 17.

By referring to FIGURE 2, it will be noted that the shaft 59 has a circular flange 64 attached thereto, and this flange 64 has a movable damper plate 65 attached to it, which plate 65 consists of a plurality of angularly spaced prime shutters 66, corresponding in number to the openings 57 in the damper plate 54 and corresponding to the size of the solid sections 56. Similar plates 67 and 68 carry auxiliary shutters of a shape and contour similar to the prime shutters 66, but these plates 67 and 68 are individually rotatably mounted on the shaft 59, and free to move when actuated by the shutters 66 on the plate 65 which is rigidly mounted on the shaft 59 and rotated unitarily therewith.

The prime shutters 66 are equipped with pins 69 (see FIGURE 3) that engage arcuately disposed slots 70 in the auxiliary shutters 67, and the shutters 67 are provided with pins 71 engaging slots 72 in the auxiliary shutters 68.

In this manner the openings 57 will be closed or opened gradually by the movement of the prime shutters 66 which are revolved by means of the shaft 59 which is revolved by the shaft 15 through the speed reducer 58 when the propeller fan 17 is caused to revolve by the air current. The pins 69 and 71 on the shutters 66 and 67, respectively, will cause the openings 57 in the damper plate 54 to be opened or closed gradually by the air current actuating the propeller 17. When the prime shutters 66 move from the fully open position illustrated at the bottom of FIGURE 3, they will gradually close about one-third of the open areas of plate 54, and then pins 66 will cause movement of the shutters 67 to close off another one-third of the open area. As movement continues, the pins 71 will cause movement of the shutters 68 until the prime and auxiliary shutters together close off the open areas.

From the foregoing it will be seen that we have provided a simple flow velocity regulating mechanism which allows the user to maintain any preselected maximum velocity in the air duct. The user can set the system for any such desired velocity by sliding the weight along the bar 43 to provide a desired opening bias for the regulating damper. The bar may be provided with markings, if desired, so as to assist the user in selecting the proper setting of the weight for the proper desired velocity.

The bias of the weight is sufficient to keep the damper open and the duct substantially unrestricted until the flow velocity reaches the preselected value. When the velocity rises above this value, its force directed against the movable vane or vanes of the fan provides a torque sufficient to start closing movement of the damper against the bias of the weight. As the damper closes, it restricts the flow, and closing will continue until the restriction is sufficient to reduce the velocity and stop movement of the actuating vane or vanes. If the dampers must be substantially closed to reduce the velocity sufficiently to stop the vane movement, they will stay at that position.

In general, the damper will be moved to the position providing the restriction necessary to balance the weight by the torque imparted to the vane by the flow velocity.

If the velocity drops below the preselected amount, the damper will move to the full open position until the velocity starts building up beyond the preselected amount.

The system is highly advantageous when used with branch ducts associated with a main fluid supply duct. When so used, it regulates and maintains the desired velocity in each individual duct, without adverse effect due to a build-up of pressure in the main duct which may be due to a change in velocity or pressure in other branch ducts.

Whereas we have shown and described an operative form of our invention, we wish it to be understood that this showing is to be taken in an illustrative or diagrammatic sense only. There are many modifications to the invention which will be apparent to those skilled in the art and which will fall within the scope and spirit of the invention. The scope of the invention should be limited only by the scope of the hereinafter appended claims.

We claim:

1. A flow control unit including an elongated air duct, a fan mounted for rotation in one portion of said duct, another portion of said duct having an enlarged cross sectional flow area with respect to said first named portion, baffle means supported in said enlarged portion of said duct and having flow resisting surfaces extending in planes generally transversely of the axis of said duct, said fan being mounted on a shaft, an actuating shaft adapted during rotation thereof in opposite directions to move said baffle means towards flow restricting and non-flow restricting positions, speed reduction means between said shafts, an elongated bar pivotally mounted on the outside of the duct and a weight adjustably mounted along said bar for movement to various positions and distances from the pivot point of said bar, means extending through said duct for interconnecting said bar with said baffle means actuating shaft, whereby rotation of said fan induced by air flow past said fan moves said baffle means towards flow restricting position while reduction in air flow past said fan allows said bar to move said baffle means toward a non-flow restricting position.

2. The structure of claim 1 wherein said bar is mounted in a compartment fixed to the exterior of said duct and extends parallel to the longitudinal axis of the duct.

3. The structure of claim 1 wherein said baffle means is in the form of a series of movable flat plates fixed to and rotable with said actuating shaft, said movable plates being adapted for cooperative opening and closing relation to a series of openings in a stationary baffle means in said enlarged portion.

References Cited in the file of this patent

UNITED STATES PATENTS

| | | |
|---|---|---|
| 566,073 | Fox | Aug. 18, 1896 |
| 1,343,162 | Sherwen | June 8, 1920 |
| 1,685,205 | Stein | Sept. 25, 1928 |
| 2,670,756 | Granberg | Mar. 2, 1954 |

FOREIGN PATENTS

| | | |
|---|---|---|
| 619,469 | Germany | Oct. 2, 1935 |